Patented July 12, 1949

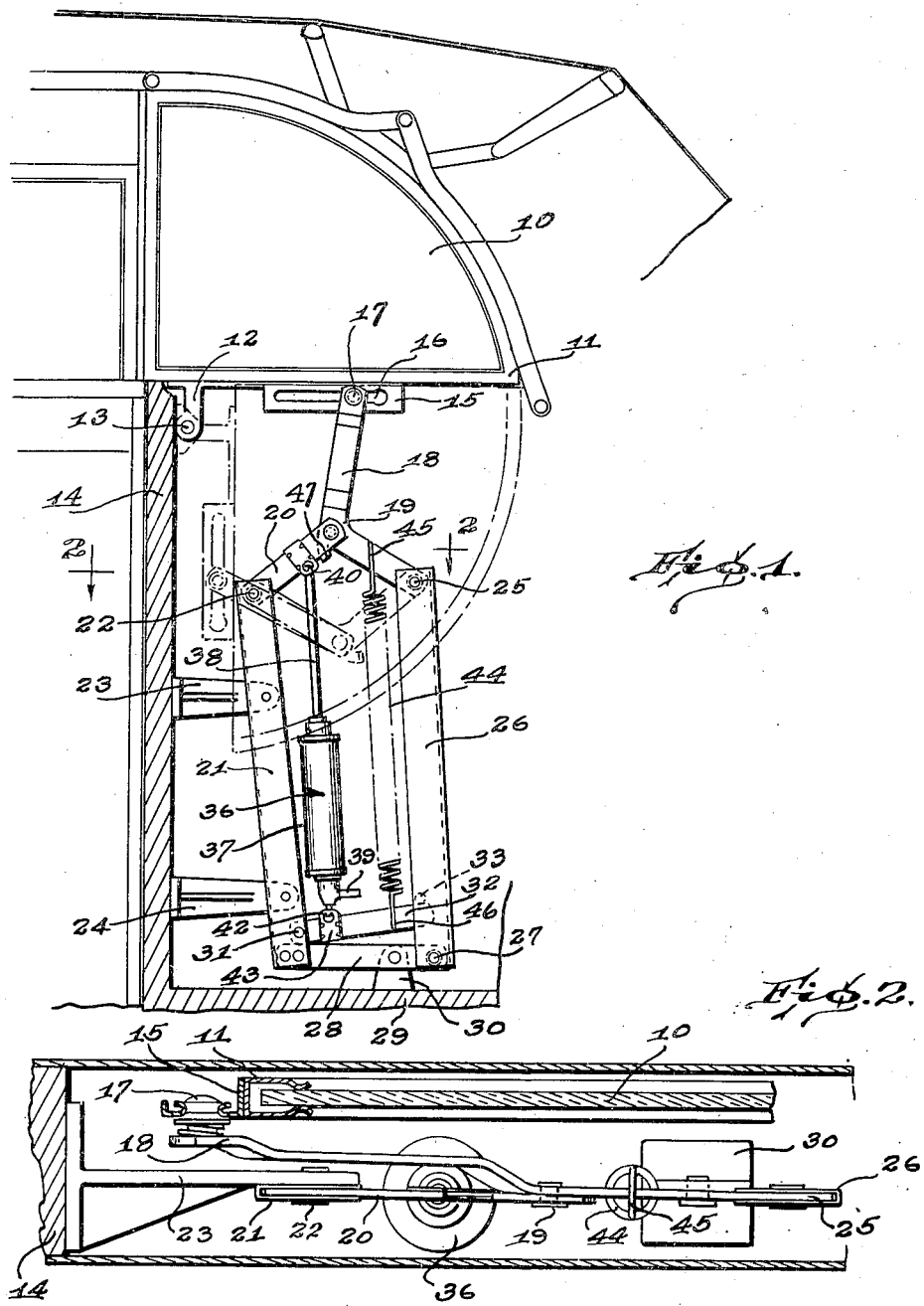

2,475,985

UNITED STATES PATENT OFFICE 2,475,985

REGULATOR MECHANISM FOR REAR QUARTER WINDOW PANELS

John B. Parsons, Toledo, Ohio

Application June 23, 1945, Serial No. 601,129

2 Claims. (Cl. 268—125)

This invention relates to a regulator mechanism particularly adapted for controlling the rear quarter vehicle windows between the open and closed positions in automobile bodies of the convertible coupe design.

An object of this invention is the production of a new and improved window regulator of the above type which acts through lever means to turn the window and its enclosing frame about a pivotal connection thereby causing the window to vanish within the enclosing automobile body from its upright serviceable position.

Another object is to produce a new and improved window regulator of the above type having the free end of an angular shaped arm slidingly connected to the edge portion of the window frame and the other angular and end portions interconnected in such manner that an operating member may be employed to actuate the arm to impart the desired window movement.

Other objects of the invention reside in the details of construction, arrangement and operation as hereinafter described, and for purposes of illustration but not of limitation, an embodiment of the invention is shown in the accompanying drawings in which Figure 1 is a side elevational view of the regulator mechanism mounted in the rear panel section of the automobile body showing the rear quarter window in the raised or closed position; and Figure 2 is a sectional view substantially on the line 2—2 of Figure 1 showing the regulator mechanism in relation to its location within the panel section with the window in its lowered position.

The illustrated embodiment of the invention comprises a rear quarter window glass 10 retained in a frame 11 with an arm 12 extending from the lower front end portion of the frame 11 and adapted for pivotal connection to the lug 13 which extends from the body frame 14. The lug 13 and arm 12 are positioned such that the rotation of the window 10 through an angle of substantially 90° from its raised position will result in the complete disappearance of the window within the automobile panels.

A retainer member 15 having an elongate slot 16 is attached to the lower central portion of the window frame 11. A stud 17, adapted for sliding movement in a slot 16, is connected to one end of an angular arm 18, bent as shown in Figure 2 in order that other elements of the mechanism may be avoided during the swinging movement of the end portion. Pivotally connected at the angular portion of the arm 18 is a straight member or arm 20 which is pivotally attached at its other end to a vertically disposed frame arm 21 by a pin 22. The frame arm 21 is positioned by attachment to bracket arms 23 and 24 which are connected to the body frame 14. A pin 25 connects the other end portion of the angular arm 18 to another vertically disposed frame arm 26, the lower end of which is connected for rotational movement by a pin 27 to one end of a horizontally disposed stationary cross piece 28 which in turn is anchored to and spaced from the lower body frame 29 by a bracket arm 30 to which it is attached. The other end of the member 28 is securely riveted to the lower end portion of the frame arm 21. A pin 31 permits rotational movement of a lever arm 32 to the near lower end portion of the frame arm 21, but the rotational movement of the lever arm 32 is restricted by a stop 33 on the lower portion of the frame arm 26.

Detailed description of the hydraulic cylinder assembly 36, disposed between the frame arms 21 and 26, is unnecessary for its use and construction are well-known to those skilled in the art. Suffice it to say that it is composed of a cylinder 37 which contains a piston to which a rod 38 is attached, said piston being actuated by a fluid flowing through a tube 39 and into the lower portion of the cylinder 37. A ball and socket connection 40 is provided between the end of the piston rod 38 and an intermediate portion of the arm 20. Another ball and socket connection 42 is provided between the lover end of the cylinder 37 and the lever arm 32. Manifestly, with such ball joint connections, the cylinder assembly 36 is adapted for rotational movement as well as swinging movement. A helical coil spring 44 is disposed alongside the cylinder assembly 36, one end of said spring being anchored at 45 to the central portion of the angular arm 18 as shown in Figure 1, and the other end anchored at 46 to the near end portion of the bracket arm 31. It is also to be understood that, as indicated in my Patent No. 2,400,572, dated May 21, 1946, an electrical assembly may be used in substitution for the hydraulic cylinder assembly to impart upward and downward movement to the straight arm member 20.

Upward movement of the window panel 10 is stopped upon engagement of an ear 47, integrally attached to the angular portion of the angular arm 18, and the adjacent edge of the straight member 20. Downward movement of the window panel is limited by the length of the piston stroke in the cylinder 36, which may be accurately designated with each unit. It is to be understood that a solenoid actuated valve within the cylinder 36 is controlled by switch means to entrap an amount of hydraulic fluid within the cylinder sufficient to retain the window in any desired intermediate position. Further description of such valve as well as illustration of same, is not considered necessary. However, reference is hereby made to my co-pending application above identified wherein the same is shown and described.

Manifestly when hydraulic fluid is forced through the hose 39 into the cylinder 37, the piston rod 38 is forced upward and through interaction between the straight arm 20 and the angular arm 18, both of which are pivoted upon the vertically disposed frame members 21 and 26, imparts swinging movement to the end portion of the angular arm 18 which causes the window to be rocked to its upright or closed position. When the hydraulic fluid is released from the cylinder, the coil spring 44 acts upon the lever arm and through interaction between the members, a swinging movement is again imparted to the angular arm 18 which causes the window to rock upon its pivot at 13, such that it is returned to its lowered position. The coil spring 44 would be unnecessary if the motor, worm and gear assembly were substituted for the hydraulic cylinder assembly, for the upward and downward movement of the horizontal member 20 would be directly imparted by the selective action of the motorized unit.

The simplicity of construction and operation of this regulator is apparent. The parts can, in the main, be made from sheet metal stampings and readily assembled prior to insertion in the vehicle body. Thus the structure lends itself to economic large scale production.

It is to be understood that numerous changes in details of construction, arrangement and operation may be effected without departing from the spirit of the invention especially as defined in the appended claims.

What I claim is:

1. A regulator mechanism for a rear quarter window panel mounted on a pivot at its lower forward edge portion for swinging movements about a horizontal axis between an upper closed position in which the lower edge portion lies substantially horizontally and a lower open position in which said lower edge portion lies substantially vertically, comprising a support disposed below said window and including a base portion, means carrying a first pivot disposed upwardly and forwardly on said support and means carrying a second pivot disposed rearwardly of said first pivot, at least one of said means being movable on said support towards and away from the other, a relatively long angular arm having one end pivoted to one of said pivots and its other end slidably pivoted in an elongate guideway extending lengthwise along said lower edge portion, a relatively short, straight arm having one end pivoted to the other of said pivots and its other end pivoted to the angular portion of said angular arm, and a linear motor operatively engaged between said base portion and one of said arms.

2. A regulator mechanism for a rear quarter window panel mounted on a pivot at its lower forward edge portion for swinging movements about a horizontal axis between an upper closed position in which the lower edge portion of said window lies substantially horizontally and a lower open position in which said edge portion lies substantially vertically, comprising a substantially U-shaped frame having a base and forward and rear upstanding legs beneath said window, one of said legs being pivoted to said base, a relatively long angular arm having one end connected to the rear leg and its other end slidably engaged with the lower edge portion of said window, a relatively short straight arm having one end pivoted to the angular portion of said angular arm and its other end pivoted to said front leg, and a linear motor connected between one of said arms and said base.

JOHN B. PARSONS.

REFERENCES CITED

The following references are of record in the file of this patent:

UNITED STATES PATENTS

| Number | Name | Date |
|---|---|---|
| Re. 22,206 | Parsons | Oct. 20, 1942 |
| 2,314,429 | Simpson | Mar. 23, 1943 |
| 2,351,285 | Parsons | June 13, 1944 |
| 2,368,622 | Tarvin | Feb. 6, 1945 |
| 2,371,183 | Parsons | Mar. 13, 1945 |
| 2,398,852 | Parsons | Apr. 23, 1946 |

FOREIGN PATENTS

| Number | Country | Date |
|---|---|---|
| 282,472 | Great Britain | July 5, 1928 |